(12) United States Patent
Mruk et al.

(10) Patent No.: US 9,243,135 B2
(45) Date of Patent: Jan. 26, 2016

(54) RUBBER COMPOSITION AND RUNFLAT TIRE

(71) Applicant: The Goodyear Tire & Rubber Company, Akron, OH (US)

(72) Inventors: Ralf Mruk, Lipperscheid (LU); Frank Schmitz, Bissen (LU); Robert Fokko Roskamp, Trier (DE); Christian Jean-Marie Kaes, Schrondweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/702,795

(22) Filed: May 4, 2015

(65) Prior Publication Data

US 2015/0232649 A1    Aug. 20, 2015

Related U.S. Application Data

(62) Division of application No. 13/333,033, filed on Dec. 21, 2011, now Pat. No. 9,050,856.

(51) Int. Cl.
*C08L 15/00* (2006.01)
*C08L 91/06* (2006.01)
*B60C 1/00* (2006.01)

(52) U.S. Cl.
CPC . *C08L 15/00* (2013.01); *B60C 1/00* (2013.01); *C08L 91/06* (2013.01); *B60C 2001/0033* (2013.04)

(58) Field of Classification Search
CPC ........... C08L 15/00; C08L 91/06; B60C 1/00; B60C 2001/0033
USPC ................................. 524/575, 394
See application file for complete search history.

(56) References Cited

U.S. PATENT DOCUMENTS

| | | | |
|---|---|---|---|
| 4,895,884 A | 1/1990 | Benko et al. | |
| 4,937,290 A | 6/1990 | Bauer et al. | |
| 6,365,668 B1 | 4/2002 | Scholl et al. | |
| 7,694,708 B2 | 4/2010 | Agostini et al. | |
| 7,789,119 B2 | 9/2010 | Agostini et al. | |
| 7,847,019 B2 | 12/2010 | David et al. | |
| 8,962,730 B2 * | 2/2015 | Mruk | C08F 8/42 152/502 |
| 2007/0062625 A1 * | 3/2007 | Koster | B60C 1/00 152/209.5 |
| 2008/0045678 A1 * | 2/2008 | Koster | B60C 1/00 526/100 |
| 2008/0173382 A1 | 7/2008 | Gobinath et al. | |
| 2010/0230158 A1 | 9/2010 | Hase et al. | |
| 2014/0148555 A1 | 5/2014 | Mruk et al. | |

FOREIGN PATENT DOCUMENTS

JP    2008-163239    7/2008

OTHER PUBLICATIONS

Brummelhuis, et al, Supporting Information to Thiol-ene Modification of 1,2-Polybutadiene Using UV—or Sunlight, Polym. Sci .. Part A: Po/ym. Chem., 1972, 2008, pp. S1-S5, vol. 41, Macromolecules, Potsdam, DE.
Brummelhuis, Niels Ten et al, Thiol-Ene Modification of 1,2-Polybutadiene UsingUV Light or Sunlight, Macromolecules, 2008, 9946-9947, 41.
Gerber, et al, Mercaptopropionitrile (2-Cyanoethanethiol), Organic Synthesis, copyright 1921-2005, pp. 234 and 186, vol. 10 and vol. 77, Organic Synthesis.
Harrisson, Radical-Catalyzed Oxidation of Thiols by Trithiocarbonate and Dithioester RAFT Agents: Implications for the Preparation of Polymers with Terminal Thiol Functionality, Macromolecules, Jan. 13, 2009, pp. 897-898, vol. 42.
Joseph R. Carllse, Marcus Week, Side-Chain Funtionalized Polymers Containing Bipyridine Coordination Sites: Polymerization and Metal-Coordination Studies, Journal of Polymer Science: Part A: Polymer Chemistry, 2004, 2973-2984, 42, US.
Kristi Ohr, Rebekah L. Mclaughlin, and Mary Elizabeth Williams, Redox Behavior of Phenyl-Terpyridine-Substituted Artificial Oligopeptides Cross-Linked by Co and Fe, Inorganic Chemistry, 2007, 965-974, 46, US.
Lutz, Jean-Francois et al, Modular chemical tools for advanced macromolecular engineering, Polymer, Feb. 18, 2008, 817-824, 49, Potsdam, DE.
Matthew Kryger, Applications of Thiol-Ene Coupling, Abstract, Dec. 11, 2008, 1-8.
Moad, Graeme et al, Living Radical Polymerization by the RAFT Process, AllSt. J. Chem, 2005, 379-410, 58, CSIRO Publishing, AU.
Ulrich S. Schubert* and Christian Eschbaumer, Macromolecules Containing Bipyridine and Terpyridine Metal Complexes: Towards Metallosupramolecular Polymers, Angew. Chem. Int. Ed., 2002, 2892-2926, 41, NL.

* cited by examiner

*Primary Examiner* — Angela C Scott
(74) *Attorney, Agent, or Firm* — John D. DeLong

(57) ABSTRACT

The present invention is directed to a rubber composition comprising: a functionalized elastomer comprising a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and an encapsulated metal salt.

The invention is further directed to a pneumatic runflat tire comprising a sidewall insert, the insert comprising the rubber composition.

14 Claims, 13 Drawing Sheets

RUBBER COMPOSITION AND RUNFLAT TIRE

BACKGROUND

Various tire constructions have been suggested for pneumatic runflat tires; that is, tires capable of being used while uninflated (with total loss of air pressure other than ambient atmospheric pressure). A vehicle equipped with such tires can continue to be driven after the tire experiences loss of pneumatic pressure, such as loss of air pressure caused by puncture or valve failure. This is highly desirable since it allows vehicles equipped with such runflat tires to continue in operation until they reach a location where the tire can be repaired or replaced. Tires of this type are sometimes also referred to as extended mobility tires (EMT).

The goal of engineering has been to develop a runflat tire without compromising ride or performance. In sports cars having relatively stiff suspension characteristics, the ability to provide such a runflat tire was comparatively easy as compared to providing such tires for luxury sedans that demand softer ride characteristics. Light truck and sport utility vehicles, although not as sensitive to ride performance, typically utilize tires having a relatively high aspect ratio which makes the requirements for the runflat tire more challenging.

In the case of runflat tires made utilizing stiff sidewall inserts, the insert carries most of the load on the tire during periods of operation after loss of air pressure. This leads to the generation of heat. Heat build-up can then lead to thermal degradation in the insert. A reduction in crosslink density and a change in the distribution of crosslink types is the result of this thermal degradation. Thermal degradation can accordingly lead to failure of the insert. This failure limits the range over which the runflat tire can be used during periods of operation after air loss.

SUMMARY

The present invention is directed to a rubber composition comprising: a functionalized elastomer comprising a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and an encapsulated metal salt.

The invention is further directed to a pneumatic runflat tire comprising a sidewall insert, the insert comprising the rubber composition.

DETAILED DESCRIPTION

Figure 1:
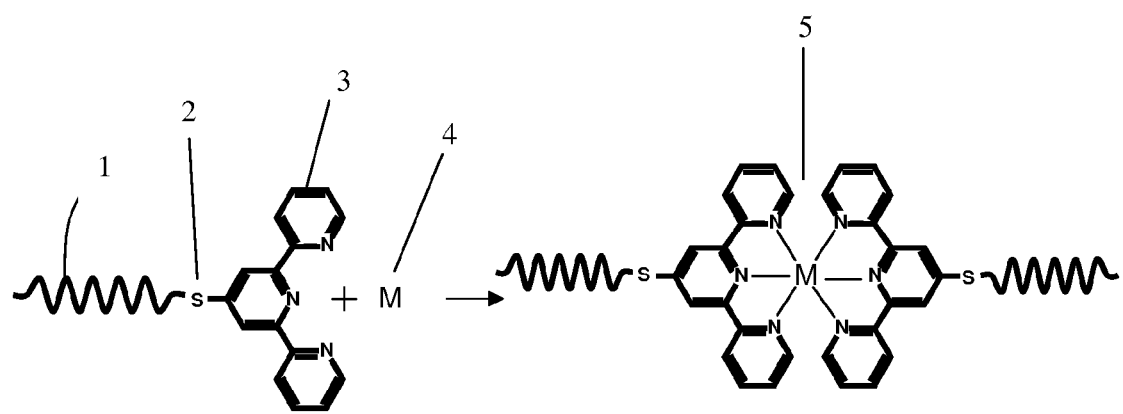
FIG. 1 shows a schematic representation of a coordination complex between a metal ion and a functionalized elastomer.

There is disclosed a rubber composition comprising: a functionalized elastomer comprising a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and an encapsulated metal salt.

There is further disclosed a pneumatic runflat tire comprising a sidewall insert, the insert comprising the rubber composition.

In one embodiment, the functionalized elastomer has the structure I

where X is a polymer derived from a monomer comprising at least one conjugated diene monomer and optionally at least one vinyl aromatic monomer; Z is a functional group comprising a multidentate ligand capable of complexing with a metal ion; Y is a divalent group bonded to both X and Z; and n is the number of $[Y-Z]$ groups bonded to X.

In one embodiment, the polymer X is a diene based elastomer comprising at least one carbon-carbon double bond. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers for use as polymer X are polyisoprene (natural or synthetic), polybutadiene and SBR.

In one embodiment, polymer X may be an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use as polymer X in this invention.

The solution polymerization prepared SBR (S-SBR) suitable for use as polymer X typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used as polymer X. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In one embodiment, the functional group Z comprising a multidentate ligand capable of complexing with a metal ion, includes but is not limited to substituted or unsubstituted bipyridinyl groups, substituted or unsubstituted terpyridinyl groups, substituted or unsubstituted phenanthrolinyl groups, and substituted or unsubstituted pyrazinyl groups, and the like.

In one embodiment, the functional group Z comprising a multidentate ligand capable of complexing with a metal ion is selected from the group consisting of substituted or unsubstituted bipyridinyl groups, substituted or unsubstituted terpyridinyl group, substituted or unsubstituted phenanthrolinyl group, or substituted or unsubstituted pyrazinyl group.

In one embodiment, the functional group Z comprising a multidentate ligand capable of complexing with a metal ion is a substituted or unsubstituted terpyridinyl group of formula II, or substituted or unsubstituted bipyridinyl group of formula III or IV

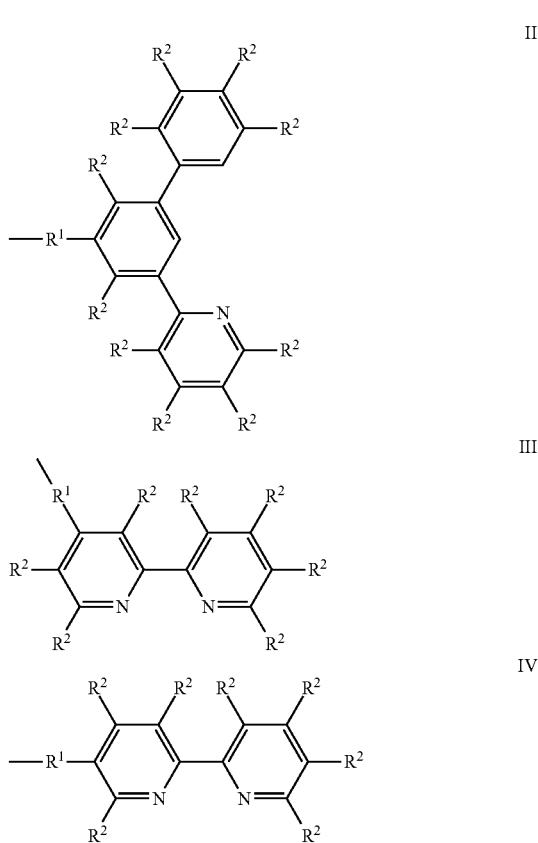

where $R^1$ forms the linkage from Z to Y in formula I and $R^1$ is a covalent bond, C2 to C8 linear alkylene, arylene, alkyl substituted arylene, aryl substituted alkylene, thioalkylene, or thioarylene, and $R^2$ are independently selected from the group consisting of hydrogen, C2 to C6 linear alkyl, and C2 to C6 branched alkyl.

In one embodiment, the functional group Z comprising a multidentate ligand is a substituted or unsubstituted 2,2';6',2"-terpyridinyl group.

In one embodiment, the functional group Z comprising a multidentate ligand is a substituted or unsubstituted 2,2'-bipyridinyl group.

In one embodiment, the —[—Y—Z] group is selected from the group consisting of 6-(2,2';6',2"-terpyridin-4'-ylsulfanyl)hexyl-1-sulfanyl, 2,2';6',2"-terpyridin-4'-ylsulfanyl, and 4-(2,2';6',2"-terpyridin-4'-yl)phenylmethylsulfanyl.

Y is a divalent group bonded to both X and Z. In one embodiment, Y is sulfur or oxygen. In one embodiment, Y is sulfur.

The number n of —[—Y—Z] groups bonded to X ranges from about 2 to about 30 in a given copolymer molecule.

By "capable of complexing with a metal ion," it is meant that as part of the functionalized elastomer of formula I, the functional group Z may form a complex structure with a metal ion; such a metal ion may be present for example by addition of a metal salt during mixing of the functionalized elastomer in a rubber composition. Suitable metal ions include those known to complex with ligands, including but not limited to zinc ions, copper ions, iron ions, ruthenium ions, and the like. The complexation of the functional group Z with a metal ion may exist as a complex between a single functional group Z and the metal ion, or as a coordination complex between 2 or more functional groups Z and a metal ion. FIG. 1 shows schematically such a coordination complex between an elastomer (1) shown as a wavy line functionalized through a sulfur linkage (2) with a terpyridine group (3) as the ligand. The addition of a metal ion M (4) is shown to form a coordination complex (5) between the metal ion M (4) and two of the ligand groups (3) of the functionalized elastomer.

The functionalized elastomer may be produced by various methods. In one embodiment, the functionalized elastomer may be produced by functionalizing the polymer X with functional group Z comprising a multidentate ligand capable of complexing with a metal ion. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the —[—Y—Z] grouping, where Y is sulfur, may be linked to the elastomer X through reaction of the thiol HS-Z with vinyl groups of the elastomer X to form a thioether of formula I, where Y is sulfur. Further details of the thiol-ene reaction as it relates to elastomers may be found by reference to U.S. Pat. Nos. 6,365,668 and 7,847,019, both fully incorporated by reference herein.

One step of the method to produce the functionalized elastomer is to obtain as a first polymer X, an elastomer comprising at least one carbon-carbon double bond.

A second step of the method is obtaining a functionalizing agent including a functional group Z comprising a multidentate ligand capable of complexing with a metal ion, and a functional group Y capable of reacting with the carbon-carbon double bond of the first polymer.

A third step of the method is reacting the first polymer X with the functionalizing agent to form the functionalized elastomer. During reacting of the functionalizing agent with the first polymer, the functional group Z is linked to the first polymer through reaction of the functional group Y with the unsaturated carbon-carbon bond of the first polymer.

In one embodiment, the functionalizing agent is reacted with the first polymer in a suitable solvent in the presence of a free-radical initiator via a thiol-ene reaction as is known in the art, see for example *Macromolecules* 2008, 41, 9946-9947. In one embodiment, the free-radical initiator is selected from the group consisting of 2,4,6-Trimethylbenzoyldiphenylphosphine oxide and azobisisobutyonitrile (AIBN).

In addition to the functionalized elastomer, the rubber composition includes an encapsulated metal ion. The disposition of the encapsulated metal ion is illustrated in the embodiment illustrated in FIGS. 2 and 3.

Figure 2:
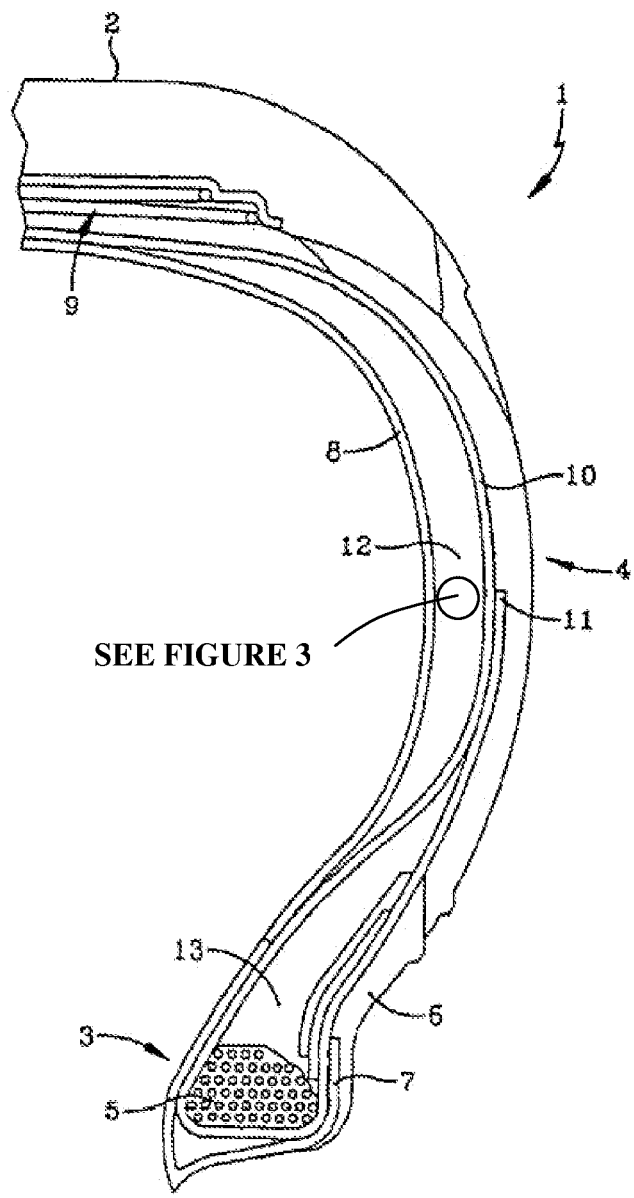
FIG. 2 shows a fragmentary cross-sectional view of a runflat tire showing its tread and carcass with one ply and one insert axially inward of the ply in the sidewall region of the tire as an embodiment of the invention.

FIG. 2 shows a fragmentary cross-section of a runflat tire 1, its tread 2, bead portion 3, sidewall or sidewall region 4, inextensible wire bead core 5, rubber chafer 6, rubber toeguard 7, rubber composition innerliner 8, belt structure 9 underlying a portion of the tread 2, carcass ply 10, carcass ply turnup 11, rubbery sidewall insert 12 and apex 13. The sidewall insert 12 may extend from each bead region radially to the edge of the tread, usually to just beneath the reinforcing belt structures 9.

Figure 3:
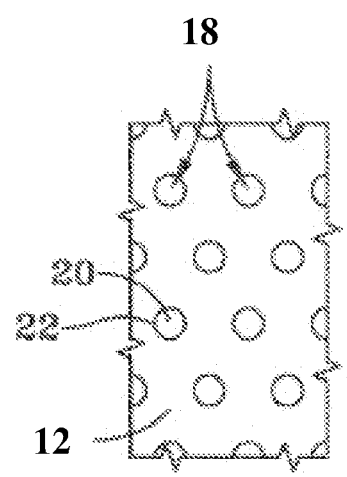
FIG. 3 shows an enlarged view of the in-circle portion of FIG. 2 showing, in cross-section, the encapsulated metal ion in accordance with an embodiment of the present invention.

An encapsulated metal ion 18, as shown in FIG. 3, is provided dispersed in sidewall insert 12 of the runflat tire 1. The encapsulated metal ion 18 includes a metal ion 20 encapsulated by a coating material defining a microcapsule 22. The rubbery sidewall insert 12, containing the encapsulated metal ion 18, generally can be formulated by means and methods known to those having ordinary skill in the art.

The coating material of the microcapsule can be selected from a multitude of materials or mixtures thereof. For example, the coating may include waxes such as paraffins, resins such as phenol formaldehyde or urea formaldehyde, carbon pitches, thermoplastic elastomers such as Kraton™ and thermoplastics such as syndiotactic polybutadiene, polyethylene (PE), polyethylene oxide, polyvinyl acetate, ethylene-vinyl acetate copolymers, polyvinyl alcohols (PVA), polyacrylic acid and derivatives, polycarbonates, polymethylmethacrylate (PMMA), polyorthoester, polyvinylpyrrolidone, or polypropylene (PP). In one embodiment, the coating material is polypropylene. In another embodiment, the coating material is paraffin. In yet another embodiment, the coating material is urea formaldehyde.

Since the encapsulated metal ion is processed with rubbery polymers, as further discussed below, to ultimately provide a rubber compound, e.g., rubbery sidewall insert 12 which is suitable for use in tire 1, the coating material selected must be able to withstand the processing temperatures. Such processing can include mixing, calendaring, extrusion, and curing (or vulcanization) steps, for example. Of the processing steps, vulcanization includes the highest temperature encountered by the coating material of the encapsulated metal ion, which may be from about 120° C. to about 180° C. depending on the characteristics of the rubber composition, for example as used in tire 1.

To that end, the coating material of the microcapsule 22 is chosen so as to be thermally stable at the temperatures it encounters during processing of the rubber compound, which includes curing, yet, selected to be thermally unstable at a desired operating temperature which may be greater than those processing temperatures. In particular, during a deflation event experienced by the run flat tire 1, the insert 12 is exposed not only to high temperatures but also to high mechanical stress. The combination of this mechanical stress with the high temperature operates as a release mechanism (i.e thermo-mechanical release) to rupture the coating material and release the metal ion. Accordingly, while the temperature experienced during the deflated run flat event may be similar to that experienced by the encapsulated metal ion during processing, the added mechanical stress during the run flat event is likely much higher that that experienced during processing. The operating temperature where the coating material is thermally unstable under the stress conditions experienced during a run flat event is referred to herein as the release temperature. Accordingly, the coating material for the microcapsule 22 is selected to both prevent release of the metal ion 20 during the processing steps, such as can occur through melting or softening of the coating material, and to release the metal ion 20, such as via melting or softening and rupture due to mechanical stress, at the release temperature of the rubber composition, for example, as used in tire 12. This release can allow the metal ion 20 to interact with the functionalized elastomer, by reacting with the surrounding rubber. In this way, that area of the rubber compound can be reinforced, for example, via stiffening of the compound. In the embodiment shown in FIGS. 2 and 3, such stiffening of the insert 12 thereby supports the sidewall 4 during a deflation event of the tire 1. Depending upon the type of coating material used, the point at which the coating material becomes thermally unstable may be defined by its glass transition temperature rather than its melting point.

As already discussed, the release temperature may be greater than the processing temperatures encountered by the coating materials of the encapsulated metal ion Such release temperatures generally vary according to tire characteristics. In one example, the insert compound of a passenger tire may experience a temperature of up to 200 C during a runflat event. However, it may be desirable to use a release temperature somewhat lower than the ultimate temperature experienced during a run flat event, to allow release of the metal ion at a lower temperature and consequent interaction of the metal ion with the functionalized elastomer to avoid exposure of the tire to the undesirable high temperatures. In this way, the mileage obtained by the runflat tire 12 during a deflation event is increased due to the stiffening of the insert 12 upon release of the metal ion.

The coating thickness of the microcapsule also must provide enough durability for the encapsulated metal ion to withstand the rigors of processing, such as mixing, but allow for rupture during the mechanical stress experienced during a deflation event. As such, in one example, the coating thickness is about 18 nm to about 6000 nm thick. Also, the diameter of the microcapsules can vary widely but generally may be from about 1 micron to about 2000 microns. In one embodiment, the diameter is from about 10 micron to about 150 microns.

Microencapsulation techniques are known to those having ordinary skill in the art. To that end, the encapsulated metal ion can be prepared in a variety of ways. One feature of the processes is that microcapsules are formed completely encasing metal ion to provide microcapsules of the type and size described above. In one example, the microcapsule is formed of a synthetic resin material, and may be produced by well-known polymerization methods, such as interfacial polymerization, in-situ polymerization or the like. In another example, the encapsulated metal ion may be prepared by allowing a mixture, which contains metal ion, molten coating material, and optionally other auxiliaries such as surfactants or dispersants, to flow in a cooling column onto a rapidly rotating device such as a rotary table and migrate to the outside because of the high centrifugal force. Because the diameter is greater at the edge, the particles are separated and the formation of agglomerates avoided. After being flung off from the edge of the rotating device, the particles, or encapsulated metal ion, fly away to the outside individually and cool in the process, as a result of which the coating solidifies.

Other processes, such as spray-drying, fluidized-bed coating, emulsion or suspension processes and precipitation also come into consideration for the preparation of the encapsulated metal ion.

Upon attained the release temperature of the encapsulated metal ion, as for example during a deflation invention in a runflat tire, the metal ion is released from the microcapsule and exposed to the surrounding rubber composition, including the functionalized elastomer. While not wishing to be bound by any theory, when in the presence of the functionalized elastomer, the metal ion may complex with the functionalized elastomer in a manner similar to that illustrated in FIG. 1 and described earlier herein. In FIG. 1, the metal ion M is illustrated as freely associated with the functionalized elastomer, such a through addition of a metal salt to the rubber composition.

The metal ion is generally added in an amount sufficient to complex with the functionalized elastomer; depending on the amount of functionalized elastomer present in the rubber composition and the number of ligand groups in an elastomer molecule, the amount of metal ion required can be easily determined by one skilled in the art. Amounts of metal ion in excess of, or less than, the stoichiometric amount of metal ion may be used, depending on the desired effect.

In one embodiment, the metal ion includes divalent copper, divalent iron, divalent cobalt, divalent nickel, and divalent ruthenium, i.e., $Cu^{2+}$, $Fe^{2+}$, $Co^{2+}$, $Ni^{2+}$, $Zn^{2+}$ and $Ru^{2+}$.

In one embodiment, the metal ion is added to the rubber composition as a metal salt. In one embodiment, the metal ion is added to the rubber composition as a metal salt including $FeSO_4.7H_2O$, $FeCl_2$, $NiCl_2$, $RuCl_3$, cobalt stearate, zinc stearate, and the like.

The rubber composition may optionally include, in addition to the functionalized elastomer and the encapsulated metal ion, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

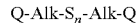

in which Q is selected from the group consisting of

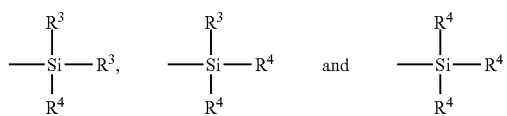

where R$^3$ is an alkyl group of 1 to 4 carbon atoms, cyclohexyl or phenyl; R$^4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula V, Q may be

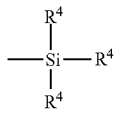

where $R^4$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfurvulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfurvulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 0.1 to about 5 phr. Lower amounts of zinc oxide may be used to avoid complexation with the functionalized elastomer. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire as are known in the art. For example, the rubber component may be a tread (including tread cap and tread base), sidewall, apex, chafer, sidewall insert, wirecoat or innerliner.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

Example 1

In this example, functionalization of a styrene-butadiene rubber with 2-mercaptonaphthalene is illustrated to demonstrate the thiol-ene reaction.

To test the reactivity and reaction conditions of the styrene-butadiene rubber in a thiol-ene reaction, some reactions with a model thiol were made. The chosen thiol was 2-mercaptonaphthalene, from Aldrich.

Figure 4:
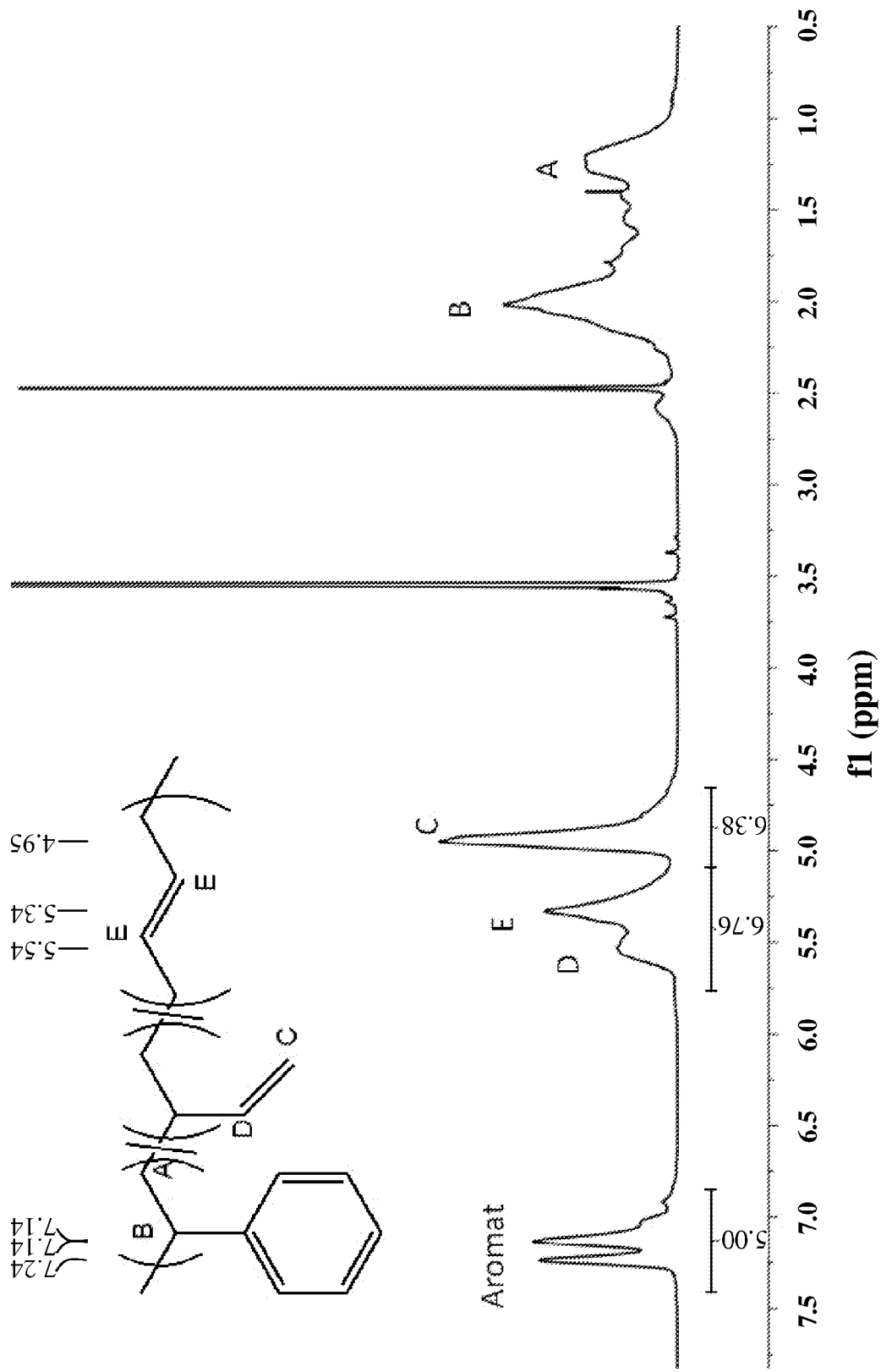
FIG. 4 shows the $^1$H-NMR spectrum of a styrene-butadiene elastomer.

The properties of the used styrene-butadiene rubber are summarized in Table 1. FIG. 4 shows the $^1$H-NMR spectrum of the elastomer.

TABLE 1

| | |
|---|---|
| Mooney (avg) | 27.6 |
| Finished Mooney | 23.1 |
| Tg (onset)/° C. | −21.74 |
| Tg (midpoint) /° C. | −17.52 |
| FTIR Styrene | 25.392 |
| FTIR Vinyl | 47.506 |
| FTIR Cis | 13.144 |
| FTIR Trans | 13.058 |
| Mn/g/mol | 124122 |
| Mw/g/mol | 207982 |
| Mz/g/mol | 327454 |
| PDI | 1.67 |

Synthesis of 2-mercaptonaphthalene functionalized rubber

This compound was synthesized twice, once with AIBN as initiator for the reaction and once with an acylphosphine oxide photoinitiator (Lucirin TPO).

For the reaction initiated by AIBN, 1 g of SBR was dissolved in 50 ml dry THF and 1.40 g of 2-mercaptonaphthalene and 0.14 g AIBN were added. The solution was degassed under a stream of argon for 2 hours and was then placed in a preheated oil bath at 75° C. The reaction was stirred for 14.5 hours at that temperature.

For the reaction initiated by the photoinitiator, a mixture of 1 g SBR, 1.40 g 2-mercaptonaphthalene and 0.30 g Lucirin TPO was degassed under a stream of argon for 2 hours and then was placed under a UV-lamp (320-380 nm) for 14.5 hours.

To make sure that no free thiol was present in the product, both reaction mixtures were dialyzed against THF for two days. Afterwards the solvent was evaporated and the product was dried under vacuum.

Figure 5:
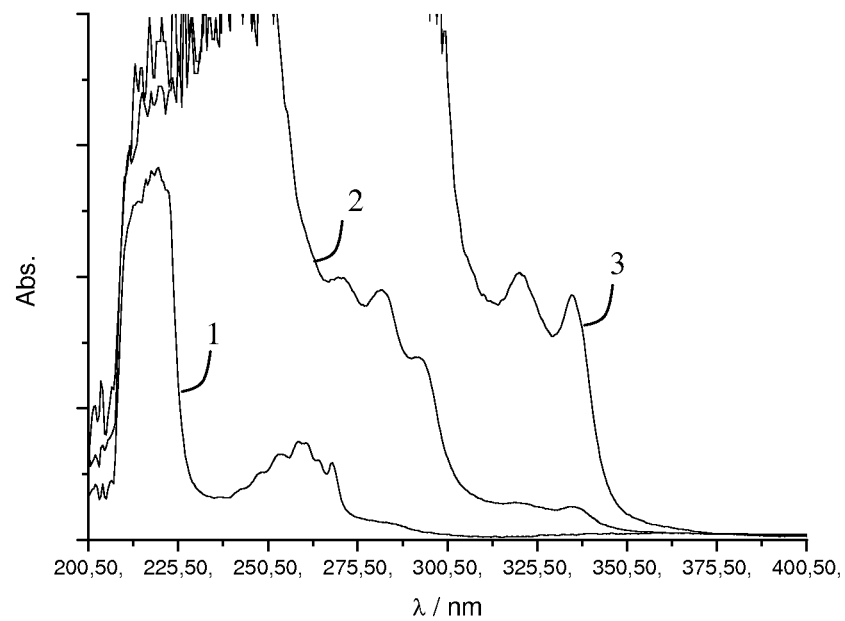
FIG. 5 shows the UV-vis spectrum of a styrene-butadiene elastomer before and after the reaction with 2-mercaptonaphtalene and the spectrum of the pure thiol.
Figure 6:
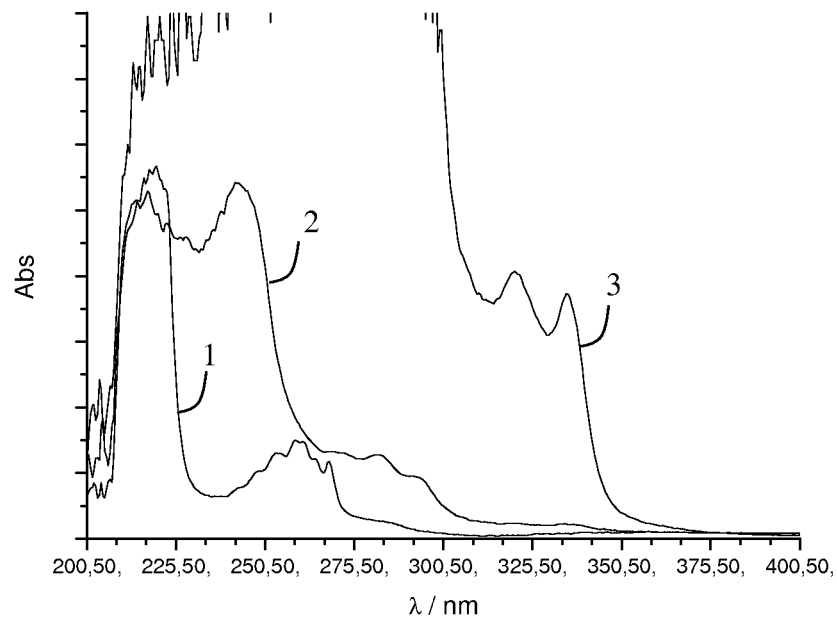
FIG. 6 shows the UV-vis spectrum of a styrene-butadiene elastomer before and after the reaction with 2-mercaptonaphtalene and the spectrum of the pure thiol.

FIG. 5 shows the UV-vis spectrum of the elastomer before (1) and after the reaction with 2-mercaptonaphtalene (2) and the spectrum of the pure thiol (3). Here the photoinitiator was used. FIG. 6 shows the same for the reaction which was initiated by AIBN, with the UV-vis spectrum of the elastomer before (1) and after the reaction with 2-mercaptonaphthanline (2) and the spectrum of the pure thiol (3).

Figure 7:
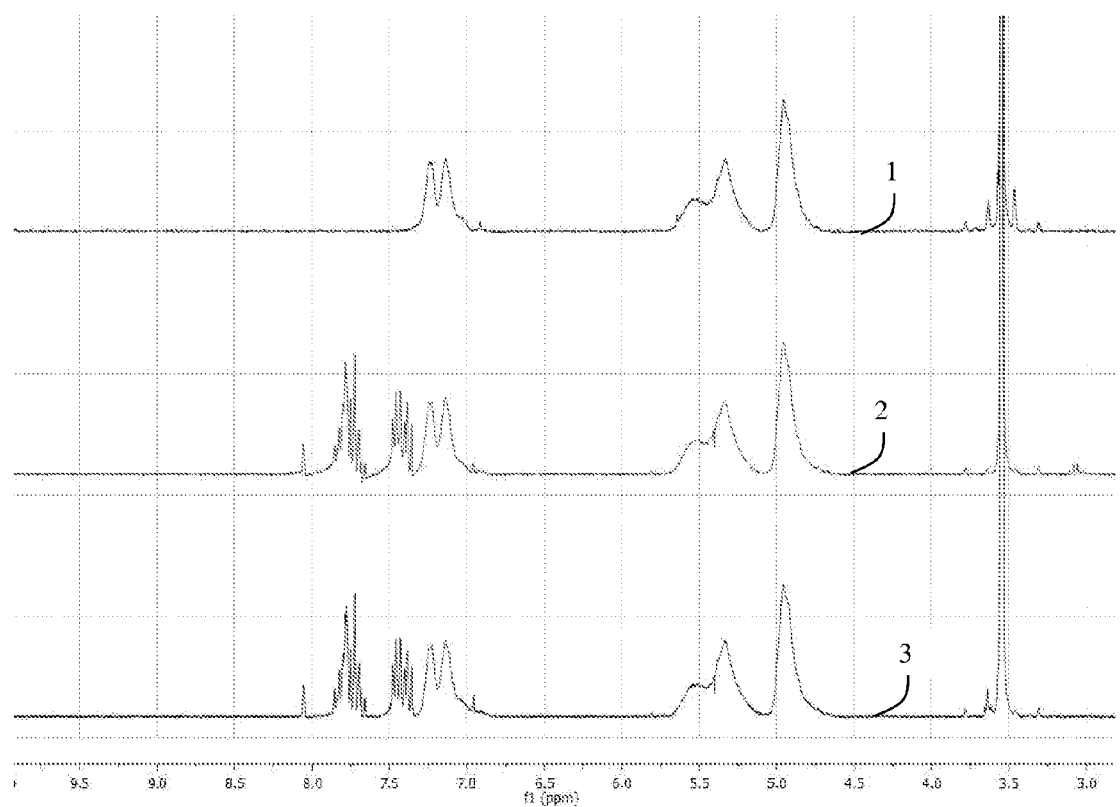
FIG. 7 shows the $^1$H-NMR spectrum of a styrene-butadiene elastomer before and after reaction with a thiol in the presence of different initiators.
Figure 8:
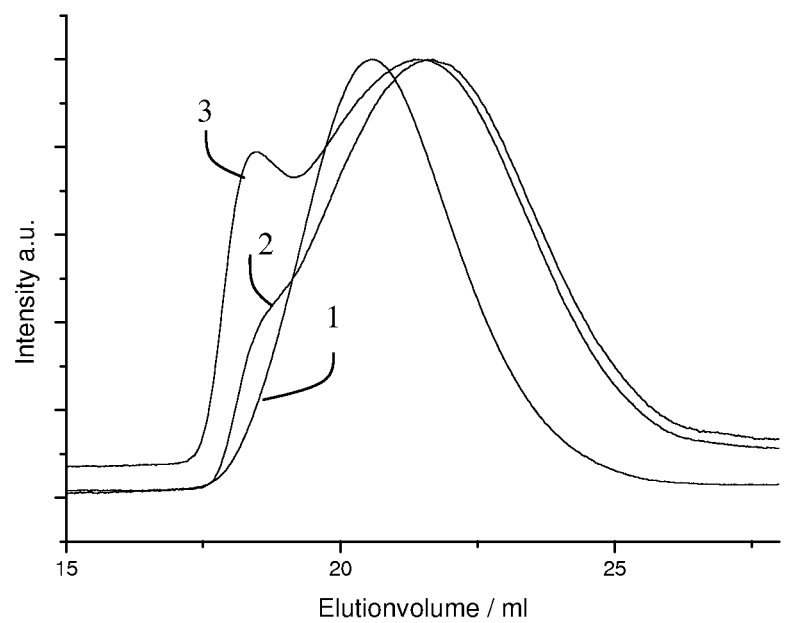
FIG. 8 shows a GPC-measurement for a styrene-butadiene elastomer, and the elastomer functionalized with a thiol in the presence of different initiators.

FIG. 7 shows the $^1$H-NMR spectrum of the elastomer before (1) and after reaction with the thiol in the presence of AIBN (2) and Lucirin (3). Compared to the $^1$H-NMR spectrum of the unfunctionalized rubber, there is an increase of the signals for the aromatic protons and a decrease for the vinyl groups after the polymer analogous reaction, confirming that the SBR was successfully functionalized with 2-mercaptonaphthalene. GPC-measurement (in THF) as shown in FIG. 8 for the SBR (1), the SBR functionalized in the presence of AIBN (2) and in the presence of Lucirin (3) confirmed that the product is not greatly cross linked. As seen in FIG. 8, especially the curve of the AIBN-initiated product (2) shows very little cross linking (small shoulder), so that the decrease of the signal of vinyl protons can be assigned to functionalization.

Example 2

In this example, functionalization of a styrene-butadiene rubber with 6-(2,2';6',2"-terpyridin-4'-ylsulfanyl)hexane-1-thiole (formula VI) is illustrated.

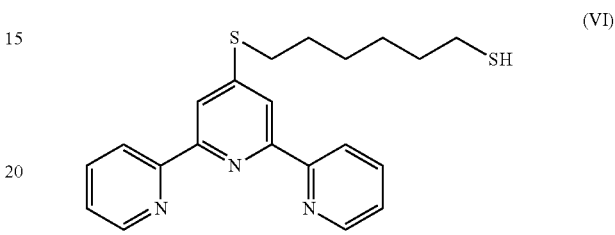

(VI)

Synthesis of 6-(2,2';6',2"-terpyridin-4'-ylsulfanyl) hexane-1-thiol

The terpyridine of formula VI was obtained in a 4 step reaction using literature procedures [U. S. Schubert, C. Eschbaumer, O. Hien, P. R. Andres, *Tetrahedron Lett.* 2001, 42, 4705; U. S. Schubert, S. Schmatloch, A. A. Precup, *Designed Monomers and Polymers* 2002, 5, 211.]. The yield and analysis at each step was as follows:

Step 1: 1,5-bis-(2'-pyridyl)-1,3,5-tricarbonyl pentane

Ethylpicolinate was reacted with acetone in the presence of NaH in tetrahydrofuran. The reaction mixture was refluxed for eight hours.

Yield: 41% yellow crystals
$^1$H-NMR (CDCl$_3$/300 MHz): δ[ppm]: 2.10 (s, 4H); 7.24 (s, CDCl3); 7.40-7.44 (m, 2H); 7.84-7.95 (m, 4H); 8.76-8.77 (m, 2H)

Step 2: 2,6-bis-(2'-pyridyl)-4-pyridone

The product of step 1 was reacted with ammonium acetate with a 48 hour reflux. Yield: 67% light pink crystals
$^1$H-NMR (CDCl$_3$/300 MHz): δ[ppm]: 6.77 (s, 2H); 7.24 (s, CDCl3); 7.36-7.38 (m, 2H); 7.77-7.86 (m, 4H); 8.64-8.66 (m, 2H)

Step 3: 4'-chloro-2,2';6',2"-terpyridine

The product of step 2 was reacted with potassium pentachloride in phosphoryl chloride with a 24 hour reflux.
Yield: 55% light purple
$^1$H-NMR (CDCl$_3$/300 MHz): δ[ppm]: 7.24 (s, CDCl3); 7.80-7.86 (m, 2H); 8.46 (s, 2H); 8.55 (t, 2H); 8.58 (t, 2H); 8.66-8.69 (m, 2H)

Step 4: 6-(2,2';6',2"-terpyridin-4'-ylsulfanyl)hexane-1-thiol

The product of step 3 was reacted with 1,6-hexanedithiol in the presence of potassium hydroxide in dimethylsulfoxide.
Yield: 35% colorless crystals ¹H-NMR (CDCl₃/300 MHz): δ[ppm]: 1.32-1.63 (m, 4H), 1.79-1.88 (m, 4H), 3.63 (q, 2H), 4.7 (t, 2H), 7.24 (s, CDCl3); 7.27-7.32 (m, 2H); 7.78-7.84 (m, 2H); 7.96 (s, 2H); 8.56-8.65 (m, 4H)

The styrene butadiene rubber of Example 1 was functionalized with 6-(2,2;6',2"-terpyridin-4'-ylsulfanyl)hexane-1-thiol following the procedures of Example 1 for 2-mercaptonaphthalene.

Figure 9:
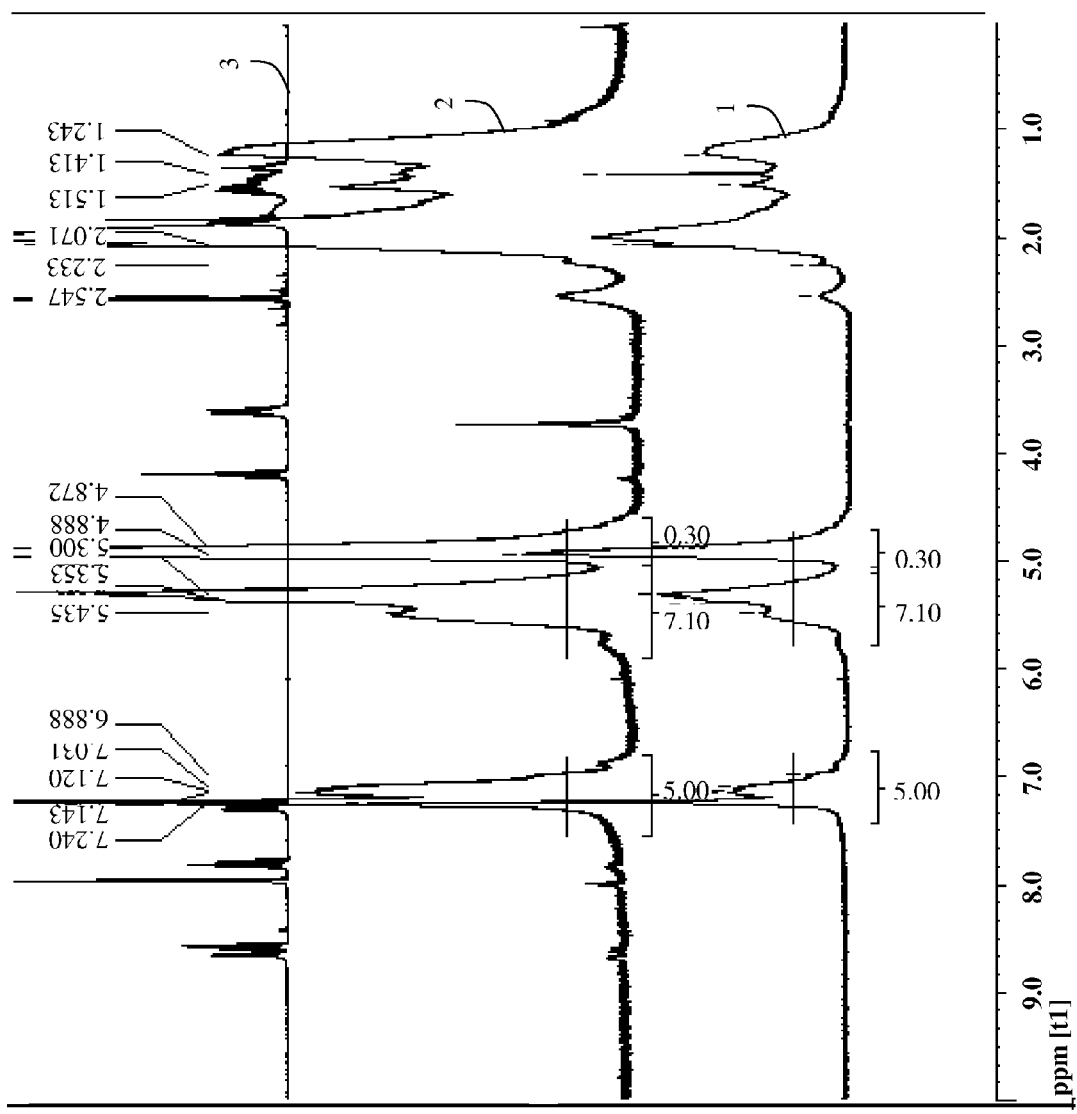
FIG. 9 shows an $^1$H-NMR of an unfunctionalized styrene-butadiene elastomer compared to the elastomer functionalized with a terpyridine ligand.
Figure 10:
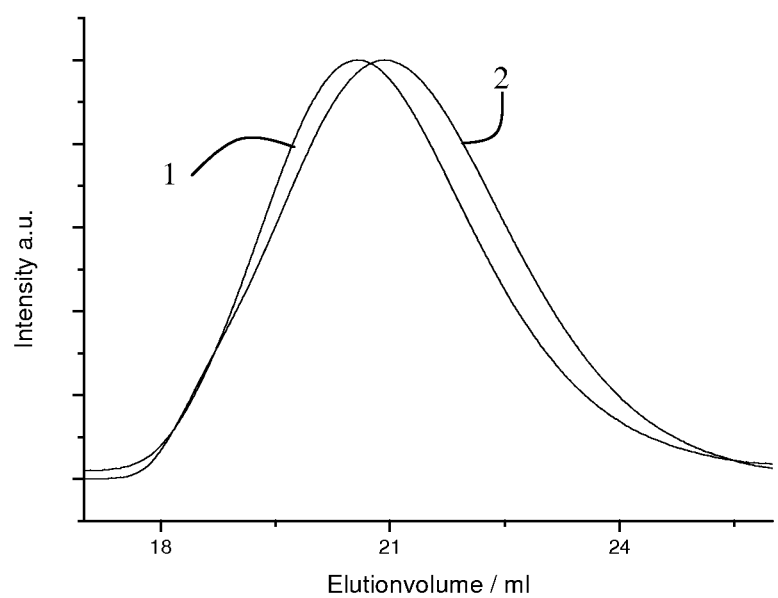
FIG. 10 shows a GPC graph for an unfunctionalized styrene-butadiene elastomer compared to the elastomer functionalized with a terpyridine ligand.

FIG. 9 shows the ¹H-NMR of the unfunctionalized elastomer (1) compared to the rubber functionalized with the terpyridine ligand (2), and the terpyridine (3). As seen in FIG. 9, a small amount of the ligand has reacted with the vinyl-groups of the elastomer. Very small signals in the aromatic region of the functionalized rubber spectrum (2) between 8 and 9 ppm belonging to the hydrogen of the ligand can be observed, indicating a successful functionalization. FIG. 10 shows a GPC graph for the SBR (1) and the functionalized SBR (2). As seen in FIG. 10, essentially no change in molecular weight could be observed in the GPC measurement, so that the reduction of vinylprotons can be assigned to functionalization.

Example 3

In this example, functionalization of a styrene-butadiene rubber with 4'-mercapto-2,2':6',2"-terpyridine (formula VII) is illustrated

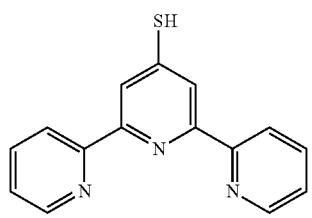

(VII)

Synthesis of -4'-mercapto-2,2':6',2"-terpyridine

The terpyridine of formula VII was obtained using the 4 step procedure as given in Example 2, with the modification that in step 4, the 4'-chloro-2,2';6',2"-terpyridine product of step 3 was reacted with sodium hydrogensulfide (NaSH) in the presence of potassium hydroxide in dimethylformamide (DMF).

Yield: 88%

The styrene butadiene rubber of Example 1 was functionalized with 4'-mercapto-2,2':6',2"-terpyridine following the procedures of Example 1 for 2-mercaptonaphthalene.

FIG. 10 shows the ¹H-NMR of the unfunctionalized elastomer (1) compared to the rubber functionalized with the terpyridine ligand (2). As seen in FIG. 9, a small amount of the ligand has reacted with the vinylgroups of the elastomer. Very small signals in the aromatic region of the functionalized rubber spectrum (2) between 8 and 9 ppm belonging to the hydrogen of the ligand can be observed, indicating a successful functionalization.

Example 4

In this example, functionalization of a styrene-butadiene rubber with 4'-(4-mercaptomethylphenyl)-2,2':6,2"-terpyridine (formula VIII) is illustrated.

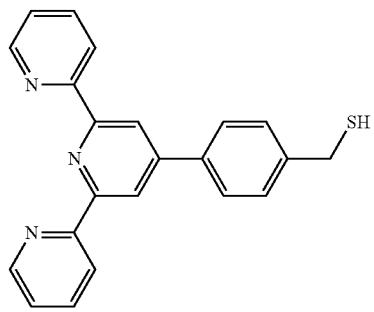

(VIII)

Synthesis of 4'-(4-mercaptomethylphenyl)-2,2':6,2"-terpyridine

Figure 11:
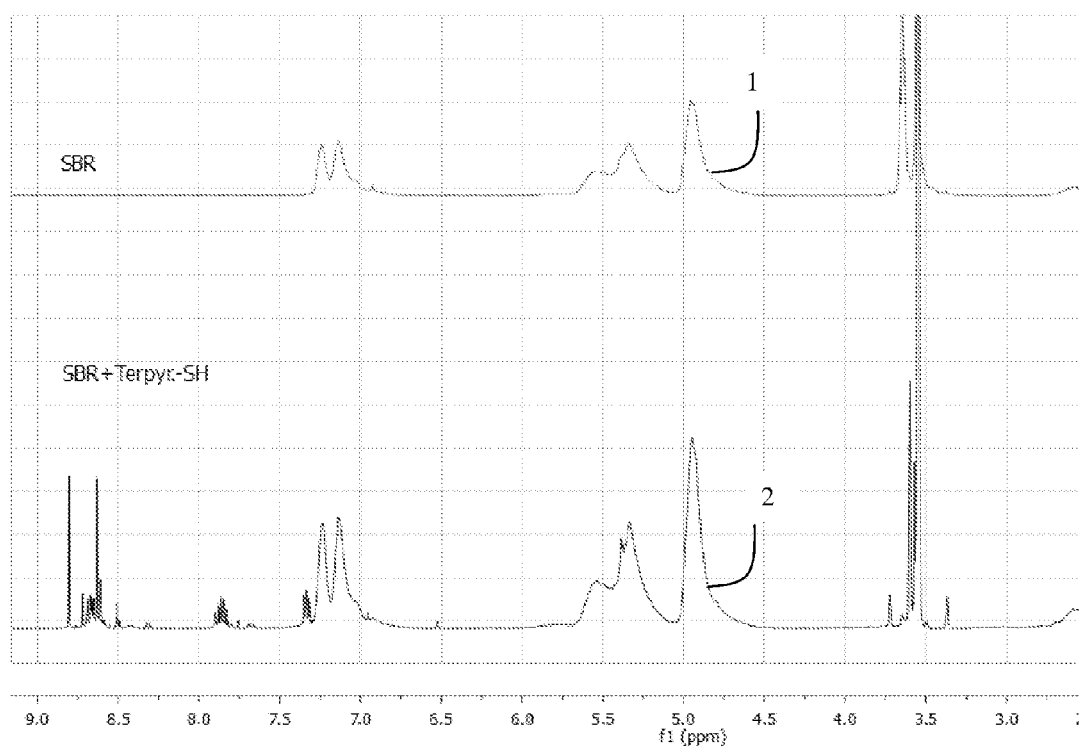
FIG. 11 shows an $^1$H-NMR of an unfunctionalized styrene-butadiene elastomer compared to the elastomer functionalized with a terpyridine ligand.

The terpyridine of formula VIII was obtained following a synthesis route as shown in FIG. 11.

Step 1: 4'-methylphenyl-2,2':6,2"-terpyridine

[X. J. Zhang, D. Li, X. P. Zhou, New J. Chem. 2006, 30, 706.] 4.6 g (0.115 mol) NaOH was mixed with 6.4 g (0.05 mol) p-tolylaldehyde and 12.8 g (0.10 mol) 2-acetylpyridine in a mortar, until a yellow powder was produced. The powder was transferred to a flask which contained 35 g ammonia acetate (excess) and 90 ml acetic acid (100%). The mixture was heated under reflux for three hours. Afterwards 50 ml ethanol and 68 ml water were added. Upon cooling the red solution the product crystallized. It was recrystallized from ethanol twice.

Yield: 65% light yellow crystals

¹H-NMR (CDCl₃/300 MHz): δ[ppm]: 2.41 (s, 3H); 7.29-7.37 (m, 4H); 7.81 (d, 2H); 7.87 (td, 2H); 8.66 (d, 2H); 8.71-8.73 (m, 4H)

Step 2: 4'-(4-bromomethylphenyl)-2,2':6,2"-terpyridine 7.07 g 4'-methylphenyl-2,2':6,2"-terpyridine, 0.28 g AIBN and 4.67 g N-Bromsuccinimide were dissolved in 70 ml benzene and heated under refux for 6 hours. The resulting suspension was filtered hot to remove the succinimide. The solvent of the filtrate was evaporated and the resulting solid was recrystallized from ethanol/aceton 2:1.

Yield: 60% dark yellow crystals

¹H-NMR (CDCl₃/300 MHz): δ[ppm]: 4.55 (s, 2H); 7.33-7.38 (m, 2H); 7.52 (d, 2H); 7.85-7.92 (m, 4H); 8.66 (td, 2H); 8.71-8.73 (m, 4H)

Step 3: 4'-(4-isothiouroniumbromidemethylphenyl)-2,2':6,2"-terpyridine

This step was carried out according to the literature procedure [G. C. Zhou, Harruna, II, Macromolecules 2005, 38, 4114].

Yield: 75%

Step 4: 4'-(4-mercaptomethylphenyl)-2,2':6,2"-terpyridine

This step was carried out according to the literature procedure [G. C. Zhou, Harruna, II, Macromolecules 2005, 38, 4114].

Yield: 95%

$^1$H-NMR (CDCl$_3$/300 MHz): δ[ppm]: 3.69 (s, 2H); 7.28-7.38 (m, 4H); 7.81-7.88 (m, 4H); 8.61-8.70 (m, 6H)

The styrene butadiene rubber of Example 1 was functionalized with 4:4'-(4-mercaptomethylphenyl)-2,2':6,2''-terpyridine following the procedures of Example 1 for 2-mercaptonaphthalene.

Figure 12:
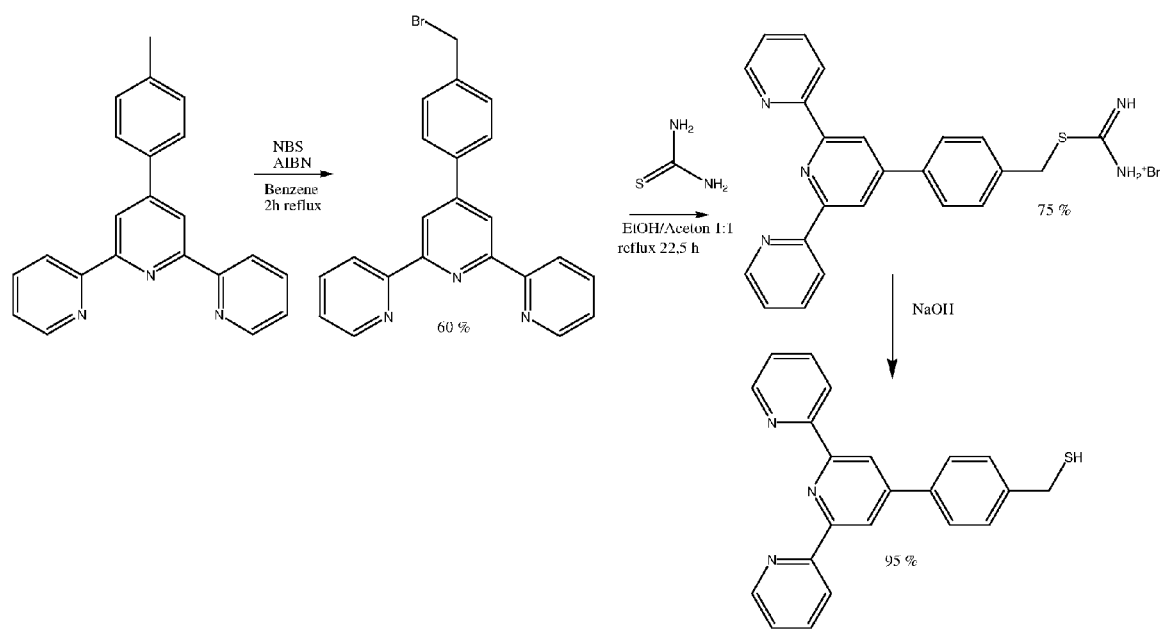
FIG. 12 a synthesis scheme for synthesis of a terpyridine ligand.

FIG. 12 shows the $^1$H-NMR of the rubber functionalized with the terpyridine ligand (2), and the terpyridine (1). As seen in FIG. 11, a small amount of the ligand has reacted with the vinylgroups of the elastomer. Very small signals in the aromatic region of the functionalized rubber spectrum (2) between 8 and 9 ppm belonging to the hydrogen of the ligand can be observed, indicating a successful functionalization.

Example 5

In this example, the effect of adding a iron salt to a functionalized elastomer is illustrated. A rubber cement was prepared by adding 0.4 g of the functionalized elastomer of Example 4 to 4 ml of THF in a small vial. The rubber cement was combined with 0.02 g of FeSO$_4$.7H$_2$O and the vial was shaken for 7 hours. Visual inspection of the rubber cement/metal salt mixture showed a purple color, as compared with the colorless rubber cement.

Figure 13:
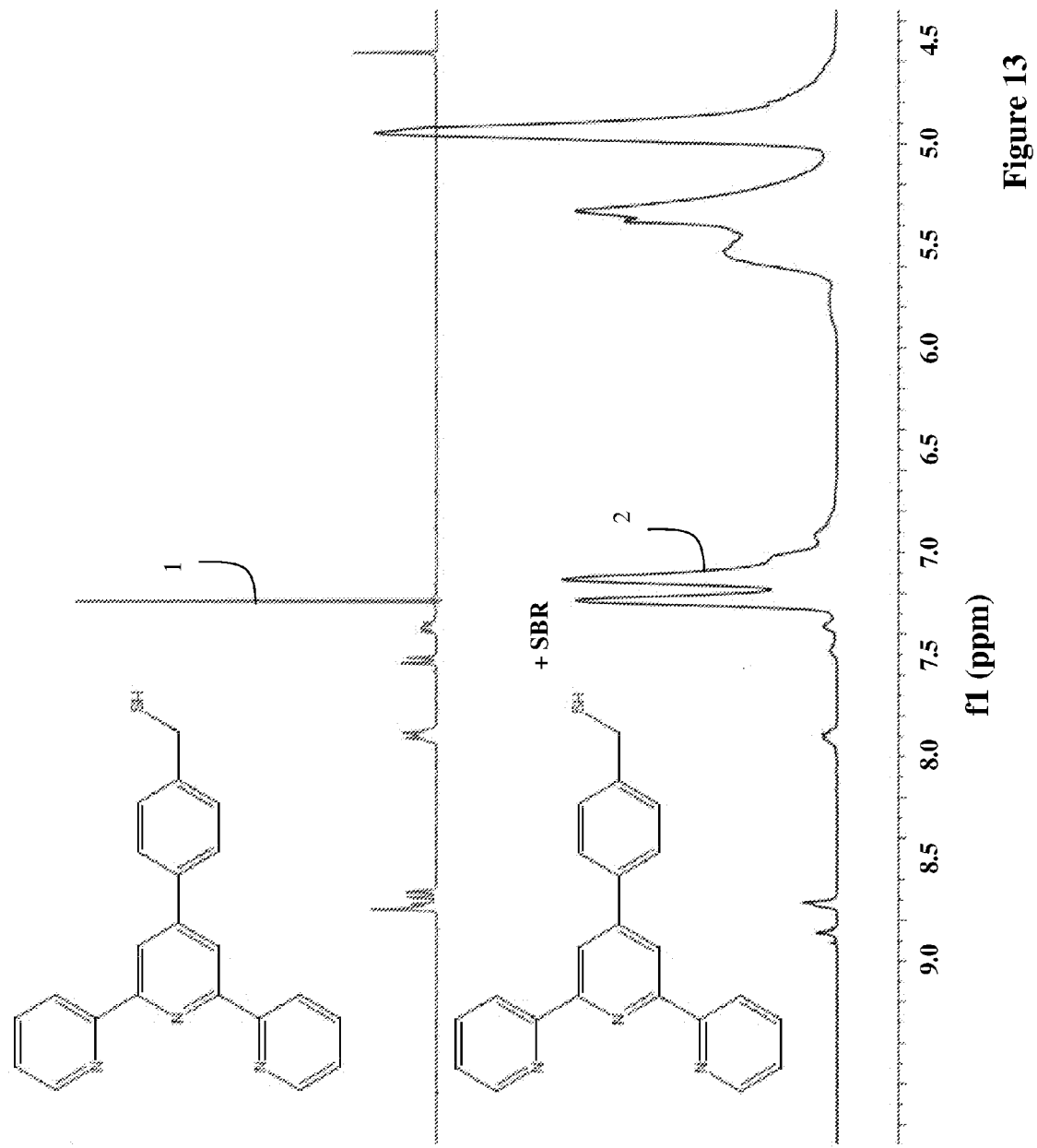
FIG. 13 shows an $^1$H-NMR of a terpyridine ligand compared to a styrene-butadiene elastomer functionalized with the terpyridine ligand.

UV-vis spectra for the rubber cement/metal salt and rubber cement are shown in FIG. 13. As seen in FIG. 13, the rubber cement/metal salt spectrum (2) shows an absorbance peak at about 571 nm, indicating the formation of a coordination complex between the terpyridine moieties of the functionalized elastomer and the Fe$^{2+}$ ion. The rubber cement spectrum (1) shows no such peak.

Example 6

In this example, the effect of adding a ruthenium salt to a functionalized elastomer is illustrated. A rubber cement was prepared by adding 0.03 g of the functionalized elastomer of Example 4 to 5 ml THF and 0.25 ml MeOH in a small vial. The rubber cement was combined with 0.02 g of RuCl$_3$ and the vial was heated up to 65° C. for 20 hours and shaken. Visual inspection of the rubber cement/metal salt mixture showed a dark red color, as compared with the colorless rubber cement.

Figure 14:
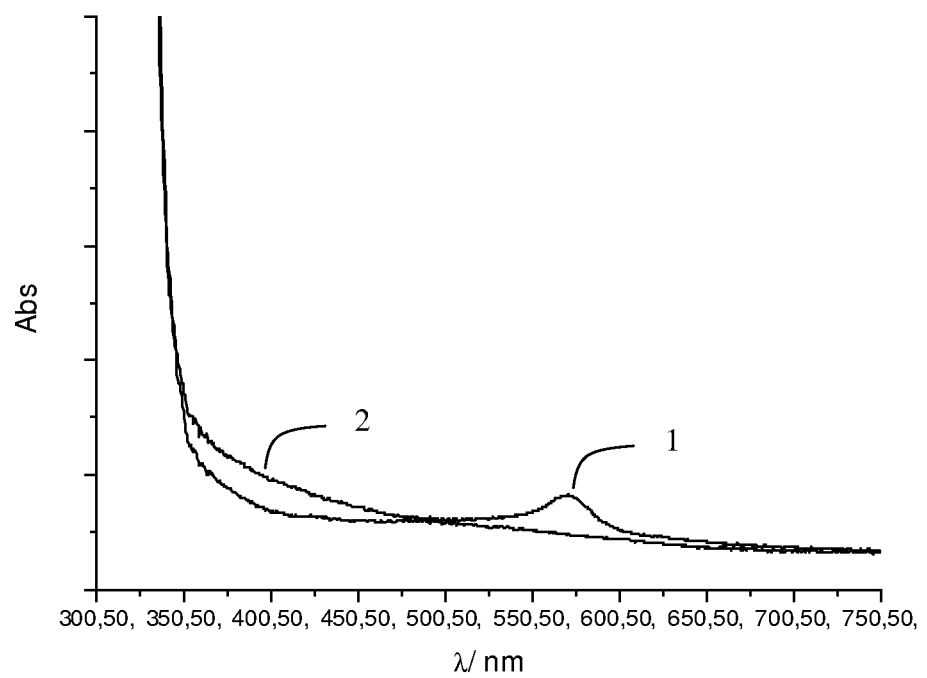
FIG. 14 shows UV-vis spectra for a rubber cement/iron salt mixture and for rubber cement.
Figure 15:
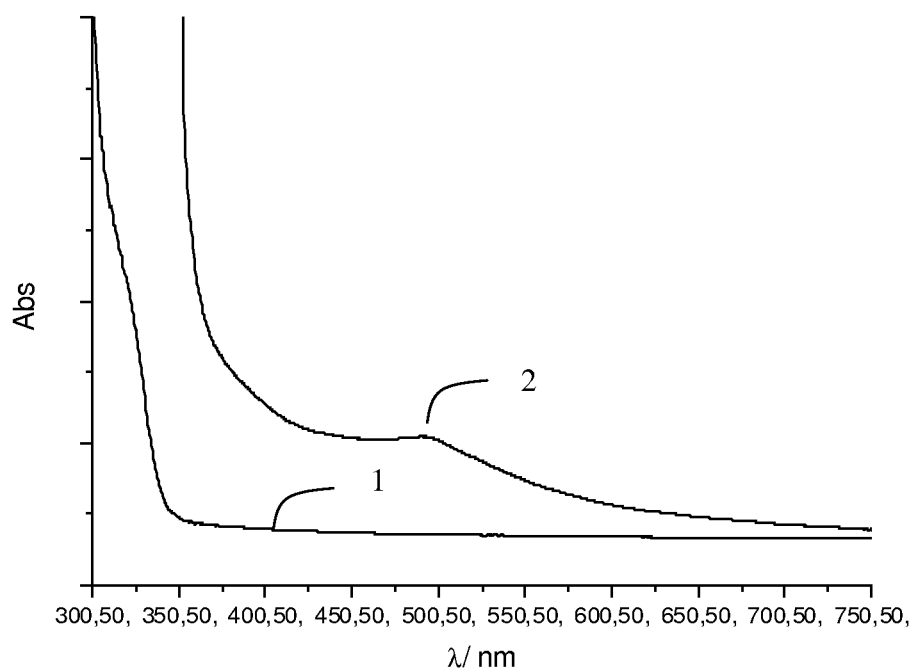
FIG. 15 shows UV-vis spectra for a rubber cement/ruthenium salt mixture and for a rubber cement.

UV-vis spectra for the rubber cement/metal salt and rubber cement are shown in FIG. 14. As seen in FIG. 14, the rubber cement/metal salt spectrum (2) shows an absorbance peak at about 490 nm, indicating the formation of a coordination complex between the terpyridine moieties of the functionalized elastomer and the Ru$^{2+}$ ion. The rubber cement spectrum (1) shows no such peak.

What is claimed is:

1. A rubber composition comprising
a functionalized elastomer comprising: a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion; and
an encapsulated metal ion.

2. A rubber composition comprising
a functionalized diene-based elastomer of formula I X—[Y—Z]$_n$ (I)

wherein X is a polymer derived from a monomer comprising at least one conjugated diene monomer and optionally at least one vinyl aromatic monomer,
Z comprises a multidentate ligand group capable of complexing with a metal ion,
Y is a divalent group bonded to both X and Z,
n is the number of —[Y—Z] groups bonded to X; and
an encapsulated metal ion.

3. The rubber composition of claim 2, wherein Z comprises a ligand selected from the group consisting of substituted bipyridinyl groups, unsubstituted bipyridinyl groups, substituted terpyridinyl groups, unsubstituted terpyridinyl groups, substituted phenanthrolinyl groups, unsubstituted phenanthrolinyl groups, substituted pyrazinyl groups, and unsubstituted pyrazinyl groups.

4. The rubber composition of claim 2, wherein Z comprises a ligand of formula II, III or IV

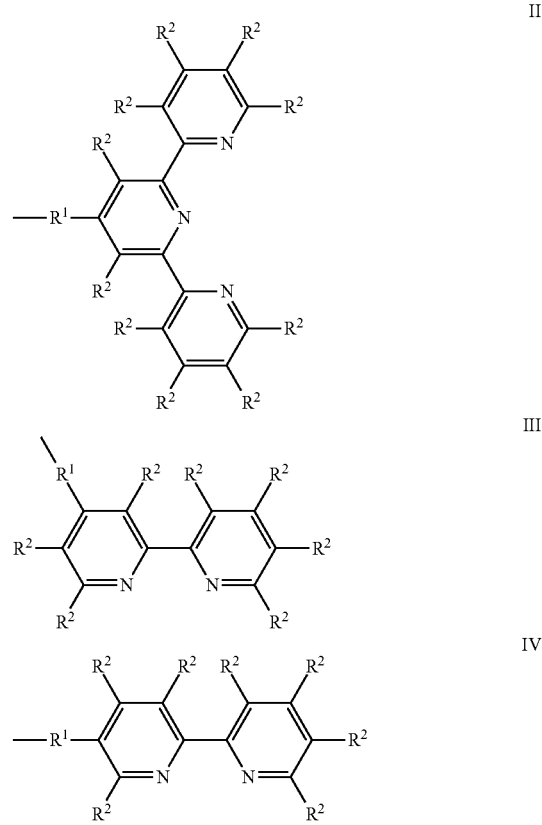

where R$^1$ forms the linkage from Z to Y in formula I and R$^1$ is a covalent bond, C2 to C8 linear alkylene, arylene, alkyl substituted arylene, aryl substituted alkylene, thioalkylene, or thioarylene, and R$^2$ are independently selected from the group consisting of hydrogen, C2 to C6 linear alkyl, and C2 to C6 branched alkyl.

5. The rubber composition of claim 2, where Y is divalent sulfur.

6. The rubber composition of claim 2, wherein Z comprises a ligand selected from the group consisting of substituted 2,2';6',2''-terpyridinyl groups, unsubstituted 2,2';6',2''-terpyridinyl groups, substituted 2,2'-bipyridinyl groups, and unsubstituted 2,2'-bipyridinyl groups.

7. The rubber composition of claim 2, wherein —[Y—Z] group is selected from the group consisting of 6-(2,2';6',2''- terpyridin-4'-ylsulfanyl)hexyl-1-sulfanyl, 2,2';6',2"-terpyridin-4'-ylsulfanyl, and 4-(2,2';6',2"-terpyridin-4'-yl)phenylmethylsulfanyl.

8. The rubber composition of claim 2, wherein X is selected from the group consisting of styrene-butadiene rubbers, polybutadiene rubbers, and polyisoprene rubbers.

9. The rubber composition of claim 2, wherein n ranges from 2 to 30.

10. The rubber composition of claim 2, wherein the encapsulated metal ion comprises a metal salt.

11. The rubber composition of claim 2, wherein the encapsulated metal ion comprises a metal salt selected from the group consisting of $FeSO_4 \cdot 7H_2O$, $FeCl_2$, $NiCl_2$, $RuCl_3$, cobalt stearate, and zinc stearate.

12. The rubber composition of claim 2, wherein the encapsulated metal ion is selected from the group consisting of $Cu^{2+}$, $Fe^{2+}$, $Co^{2+}$, $Ni^{2+}$, $Zn^{2+}$ and $Ru^{2+}$.

13. The rubber composition of claim 2, wherein the encapsulated metal ion comprises a metal salt encapsulated by a coating material.

14. The rubber composition of claim 2, wherein the encapsulated metal ion comprises a metal salt encapsulated by a coating material selected from the group consisting of waxes, resins, carbon pitches, thermoplastic elastomers, and thermoplastics.

* * * * *